Jan. 4, 1938.   A. C. BARRATT   2,104,112
VEHICLE WHEEL
Filed May 24, 1935
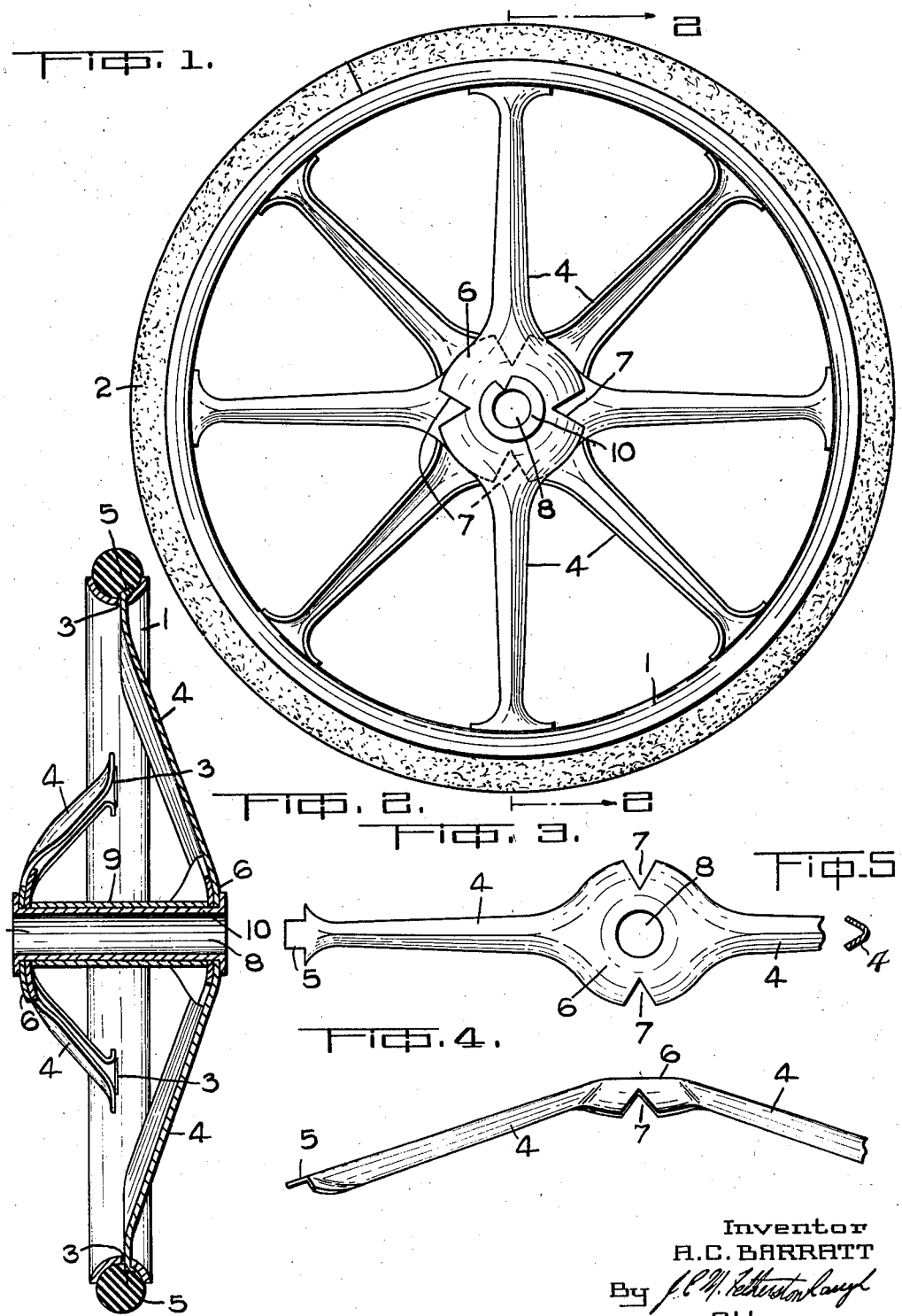
Inventor
A. C. BARRATT
By
Attorney Patented Jan. 4, 1938

2,104,112

UNITED STATES PATENT OFFICE 2,104,112

VEHICLE WHEEL

Arthur Charles Barratt, York Township, York County, Ontario, Canada

Application May 24, 1935, Serial No. 23,273
In Canada May 28, 1934

1 Claim. (Cl. 301—64)

My invention relates to improvements in vehicle wheels particularly of the type used for baby carriages, go-carts and the like, and the object of the invention is to devise a spoke wheel of improved construction which will be exceedingly rigid and light in weight for its strength and which can be economically manufactured.

With the above and other objects in view which will hereinafter appear as the description proceeds my invention consists, in its preferred embodiment, of the construction and arrangement, all as hereinafter more particularly described and illustrated in the accompanying drawing in which:—

Fig. 1 represents an elevational view of the wheel constructed according to my invention.

Fig. 2 is a vertical cross-section through the line 2—2 (Fig. 1).

Fig. 3 is a plan view of one of the spokes.

Fig. 4 is a side view thereof, and

Fig. 5 is a cross-sectional detail of a spoke.

Like characters of reference indicate corresponding parts in the different views.

In the drawing, my wheel which is of the built up spoke type, comprises the annular grooved rim 1 adapted to receive the tire 2, said rim having a plurality of spaced apart slits or orifices 3 therethrough to receive the free ends of the spokes 4. Such slits are so disposed that alternate ones are positioned in spaced relation to the centre circumferential line of the rim on alternate sides thereof.

The spokes 4 are preferably of V-shaped cross-section and each diametrically opposite pair of spokes is of integral construction, each integrally formed pair of spokes 4 having shouldered extensions 5 at their free ends and a central cup-shaped boss 6 between the spokes oppositely notched at 7 as illustrated.

The pairs of spokes are applied to the rim as illustrated in the drawing in two opposed series, the bosses 6 of the respective pairs of spokes of each series overlying and nesting into each other and such bosses of each series have central orifices 8 adapted to register with each other and with the orifices in the bosses of the opposed series when the pairs of spokes are assembled. A spacer sleeve 9 extends between the innermost bosses 6 of each series and a liner or bushing 10 is inserted into this spacer and through the boss orifice 8, the ends of the bushing being upset or riveted over the outermost bosses 6 of each series, thus with the spacer and spoke bosses comprising a composite built up hub for the wheel, the notches 7 of each boss 6 receiving the spokes 4 of the underlying pair.

The extensions 5 at the free ends of the spokes are inserted into the slits 3 and are upset or turned over against the rim. Thus a wheel of the type in which the spokes are in compression is constituted.

As illustrated in Fig. 2 the spoke ends are attached to the rim, which is of arcuate cross-section on the same side of its circumferential centre line as the bosses of such pairs of spokes lie, by having the extensions 5 inserted into the slits 3 as above described. When the spokes and hub structure are assembled the riveting over of the bushing 10 tends to force the spokes into compression and as the spoke ends are secured to the rim as described the latter acts as an abutment for the spoke ends making for a wheel of great lateral rigidity.

A wheel constructed according to my invention is exceedingly strong for its weight and owing to all the pairs of spokes being of identical construction, and each being a stamping, it can be fabricated cheaply. Furthermore, due to the composite hub construction the wheel can be readily assembled.

What I claim as my invention is:—

In a spoked wheel, independent pairs of diametrically opposed spokes, the diametrically opposed spokes of each pair being of substantially V-shaped cross-section and including a joining central cup-shaped boss, the respective pairs of spokes being disposed at an angle to each other with the boss of the underlying pair of spokes nesting into the boss of the overlying pair of spokes, and the boss of the overlying pair of spokes having opposed V-shaped indentures extending radially inward from its periphery and adapted to straddle the spokes of the underlying pair.

ARTHUR CHARLES BARRATT.